United States Patent
Call et al.

(10) Patent No.: US 8,794,717 B2
(45) Date of Patent: Aug. 5, 2014

(54) AUTOMATIC RELEASE HAND BRAKE CONTROL SYSTEM

(75) Inventors: Derick Call, Evans Mill, NY (US); Steven R Newton, Adams, NY (US); Lawrence E. Vaughn, Watertown, NY (US); Jeffrey F. Sauter, Lowville, NY (US); Howard E. Huber, Jr., Black River, NY (US)

(73) Assignee: New York Air Brake Corporation, Watertown, NY (US)

( * ) Notice: Subject to any disclaimer, the term of this patent is extended or adjusted under 35 U.S.C. 154(b) by 540 days.

(21) Appl. No.: 12/615,914

(22) Filed: Nov. 10, 2009

(65) Prior Publication Data

US 2011/0108374 A1    May 12, 2011

(51) Int. Cl.
 *B60T 15/16* (2006.01)
 *B60T 15/04* (2006.01)
 *B61H 13/02* (2006.01)

(52) U.S. Cl.
 CPC .............. *B60T 15/041* (2013.01); *B61H 13/02* (2013.01)
 USPC .................................. 303/36; 303/28; 303/71

(58) Field of Classification Search
 USPC ........ 303/7, 13, 29, 30, 71, 72, 81–83, 28, 36
 See application file for complete search history.

(56) References Cited

U.S. PATENT DOCUMENTS

| | | | | |
|---|---|---|---|---|
| 3,087,760 A | * | 4/1963 | Valentine et al. | 303/9 |
| 3,115,371 A | * | 12/1963 | Valentine | 303/29 |
| 3,224,815 A | * | 12/1965 | Horowitz | 303/71 |
| 3,759,584 A | * | 9/1973 | Klimek | 303/71 |
| 3,879,091 A | * | 4/1975 | Bridwell et al. | 303/71 |
| 4,069,836 A | | 1/1978 | Sowinski | |
| 4,099,702 A | | 7/1978 | Temple | |
| 4,232,709 A | | 11/1980 | Zoric | |
| 5,738,416 A | * | 4/1998 | Kanjo et al. | 303/7 |
| 6,175,784 B1 | | 1/2001 | Jicha et al. | |
| 6,179,093 B1 | | 1/2001 | Daugherty, Jr. | |
| 6,378,668 B1 | | 4/2002 | Zemyan et al. | |
| 6,394,559 B1 | | 5/2002 | Ring et al. | |
| 6,709,068 B2 | | 3/2004 | Herron | |
| 6,789,855 B2 | | 9/2004 | Herron | |
| 6,848,754 B2 | | 2/2005 | Ring et al. | |
| 6,902,042 B2 | | 6/2005 | Ring et al. | |
| 7,014,275 B2 | | 3/2006 | Ring | |
| 7,073,753 B2 | | 7/2006 | Root et al. | |
| 7,140,477 B2 | | 11/2006 | Engle et al. | |
| 7,487,695 B2 | | 2/2009 | Sommerfeld et al. | |
| 7,731,303 B1 | | 6/2010 | Ring et al. | |
| 8,006,815 B2 | * | 8/2011 | Sommerfeld et al. | 188/170 |
| 2011/0006595 A1 | * | 1/2011 | Vaughn et al. | 303/13 |

* cited by examiner

*Primary Examiner* — Christopher Schwartz
(74) *Attorney, Agent, or Firm* — David L. Nocilly; Bond Schoeneck & King, PLLC

(57) ABSTRACT

In a rail vehicle hand brake having a release activated by a pneumatic cylinder, the present control system includes a manual valve having an output connected to a source of pressure at an input when manually activated. A volume is to be charged by the source of pressure. A choke connects the volume to exhaust. The volume and the choke prolong the time the source of pressure is connected to the pneumatic cylinder after the manual valve is activated.

8 Claims, 5 Drawing Sheets

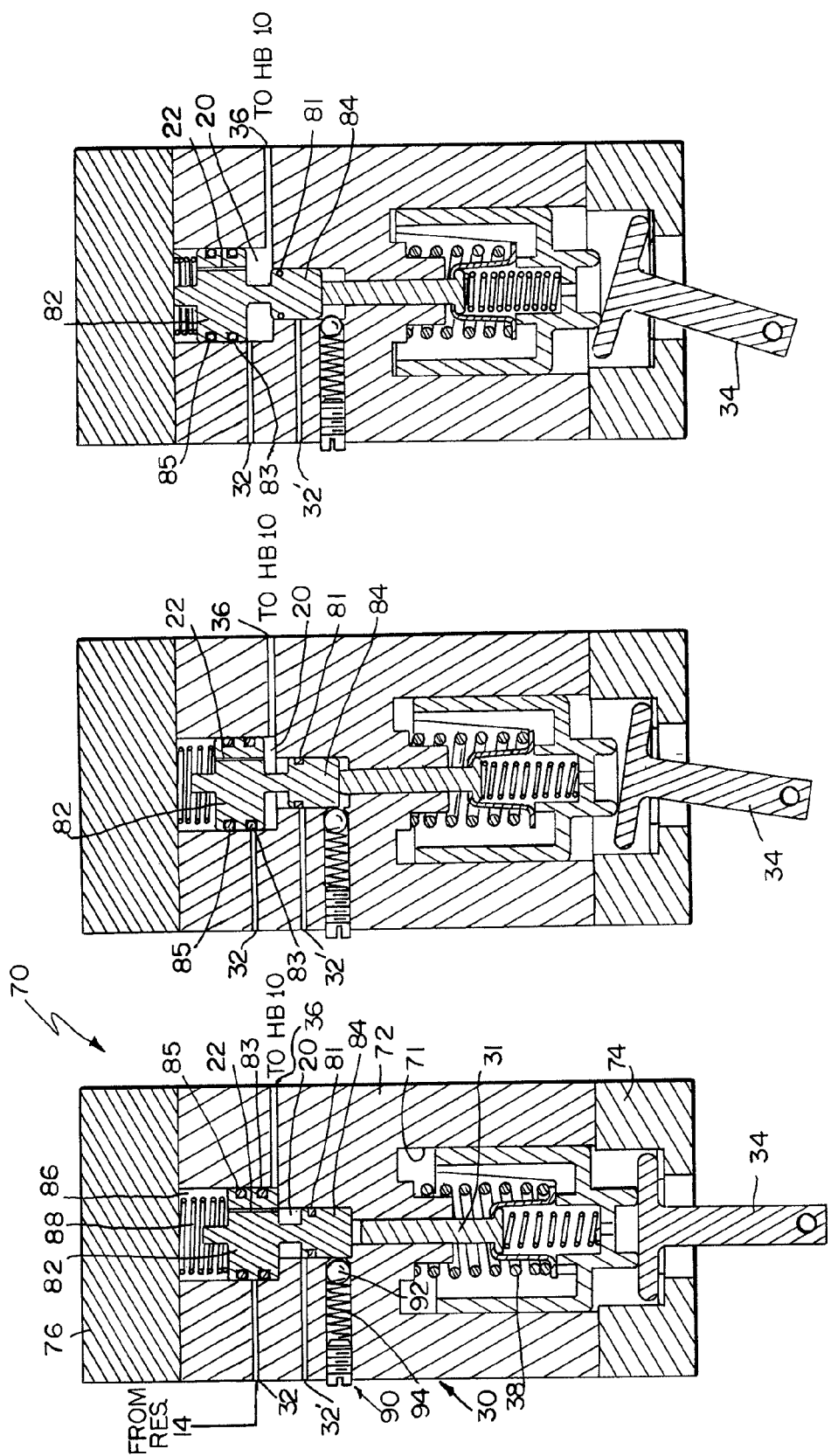

US 8,794,717 B2

AUTOMATIC RELEASE HAND BRAKE CONTROL SYSTEM

BACKGROUND AND SUMMARY

The present disclosure relates generally to automatic hand brakes and more specifically to an automatic release of hand brakes control system.

Hand or parking brakes on rail vehicles generally include a chain connected to the vehicle brakes and wound around a wheel. The brakes are applied by rotating the wheel and tensioning the chain. The hand brake includes a trigger or lever which, when activated, automatically releases the tension on the chain and releases the parking hand brake. To make sure the hand brake is fully released, the release mechanism has a prolonged release mechanical structure.

Two cylinders may be provided on the hand brake to apply the brakes by turning the wheel to tension the chain and a second cylinder to release the brakes by interacting with the release trigger or lever. A pneumatic system to control the two cylinders and the use of parallel manually actuated valves and electro-pneumatic valves are illustrated in U.S. Pat. No. 6,394,559 and U.S. Pat. No. 7,014,275, for example. The apply and release cylinders are activated by the manual valves as long as the manual valves are activated to connect a source of pressure to the cylinder and for a short period there after determined by the choke on the exhaust port of the manual valve.

The actuation of the electro-pneumatic valves as discussed herein may be by an electrically controlled pneumatic (ECP) brake network and through the cars control unit (CCU). The overall control system is described, for example, in U.S. Pat. No. 7,073,753. Remote control of the hand brake by handheld terminal is described in U.S. Pat. No. 6,175,784.

In a rail vehicle hand brake having a release activated by a pneumatic cylinder, the present control system includes a manual valve having an output connected to a source of pressure at an input when manually activated. A volume is to be charged by the source of pressure. A first choke connects the volume to exhaust. A first pneumatic valve has a pilot port connected to the volume and has an output connected to the source of pressure at an input when the volume is charged to a predetermined pressure to activate the first pneumatic valve and after the manual vale is activated. The output of the first pneumatic valve is connected to the pneumatic cylinder. The volume and the first choke prolong the time the source of pressure is connected to the pneumatic cylinder after the manual valve is activated.

The volume may be connected to the output of the manual valve and charged by the source of pressure when the manual valve is activated. Alternatively, the volume may be selectively connected to either the source of pressure or the pilot port of the first pneumatic valve by a second pneumatic valve. The second pneumatic valve connects the volume to the source of pressure when deactivated and to the pilot port of the first pneumatic valve when activated. A pilot port of the second pneumatic valve is connected to the output of the first pneumatic valve and activated when the first pneumatic valve is activated.

The output of the manual valve is connected to the pilot port of the first pneumatic valve for initially activating the first pneumatic valve. The manual valve may be a rocker valve.

A manifold includes passages for interconnecting and in which is mounted the manual valve, the first pneumatic valve and the first choke. The manifold includes ports for the source of pressure and the pneumatic cylinder. The volume is in the manifold.

Also, the control system may include a manual valve having an output connected to a source of pressure at an input when manually activated and a volume connected to the output of the manual valve and charged by the source of pressure when the manual valve is activated. A choke connects the volume to a source of lower pressure when the volume is charged. The volume and the choke prolong the time the source of pressure is connected to the pneumatic cylinder after the manual valve is activated.

The volume may be connected to the cylinder. Alternatively, the system may include a pneumatic valve having a pilot port connected to the volume and having an output connected to the source of pressure at an input when the volume is charged to a predetermined pressure to activate the pneumatic valve and after the manual valve is activated. The output of the first pneumatic vale is connected to the cylinder.

The system may include an actuator having a piston operatively connected to the manual valve. The volume is in the actuator on a first face of the piston for holding the piston and the manual valve actuated for the prolonged time. The choke continuously connects the volume to a second face of the piston opposite the first face of the piston and may be a passage in the piston. The manual valve is a slide valve having a slide and the piston is the slide of the slide valve. A detent holds the manual valve in the activated position for the prolonged time.

Other objects, advantages and novel features of the present invention will become apparent from the following detailed description of the invention when considered in conjunction with the accompanying drawings.

BRIEF DESCRIPTION OF THE DRAWINGS

FIGS. 5A, 5B, and 5C are cross-sectional views of a manifold including portions of the schematic of FIG. 1 at three stages according to the present system.

DETAILED DESCRIPTION OF THE PREFERRED EMBODIMENTS

Figure 1:
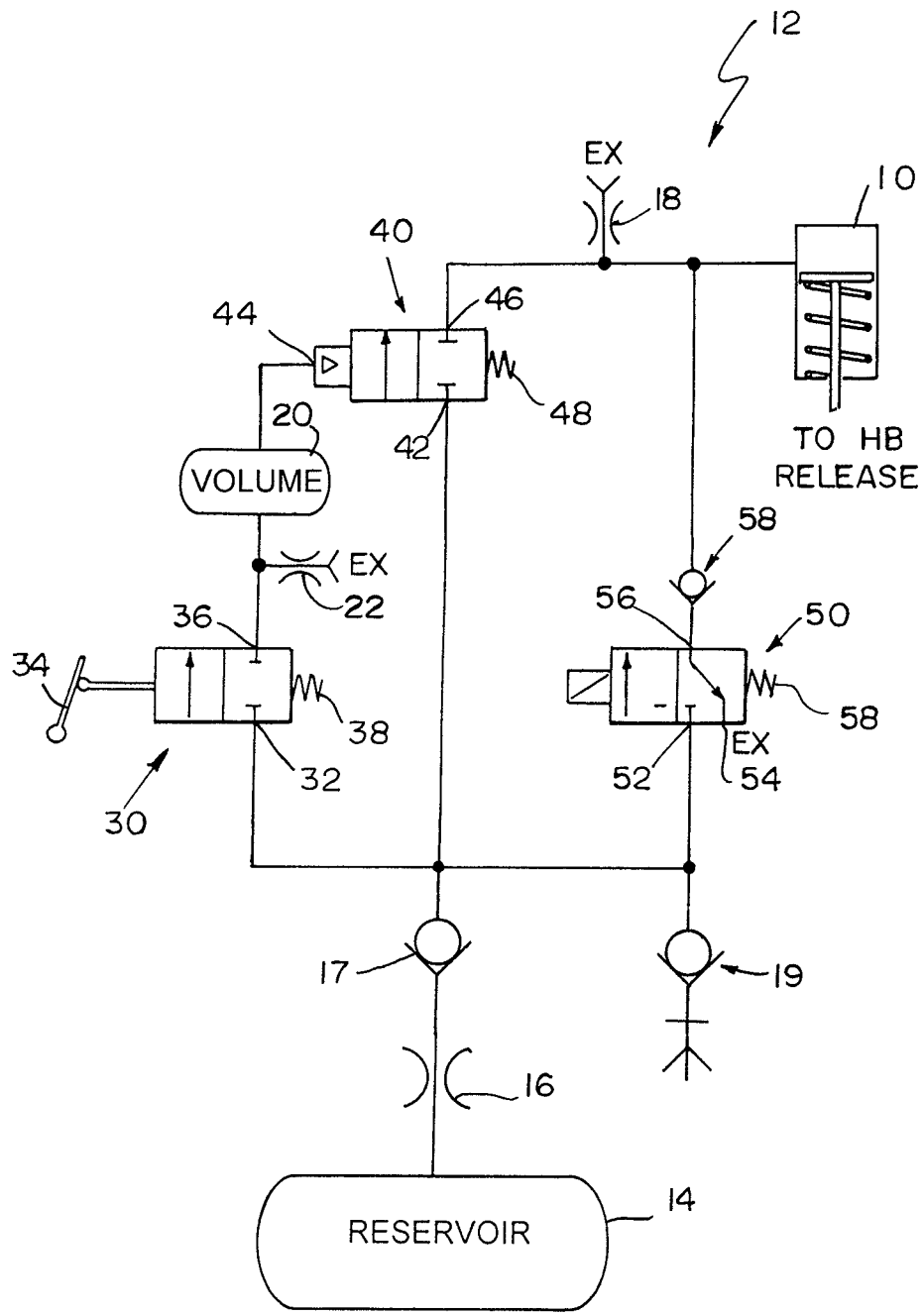
FIG. 1 is a schematic of a hand brake control system for a rail vehicle hand brake according to a first embodiment of the present disclosure.
Figure 4:
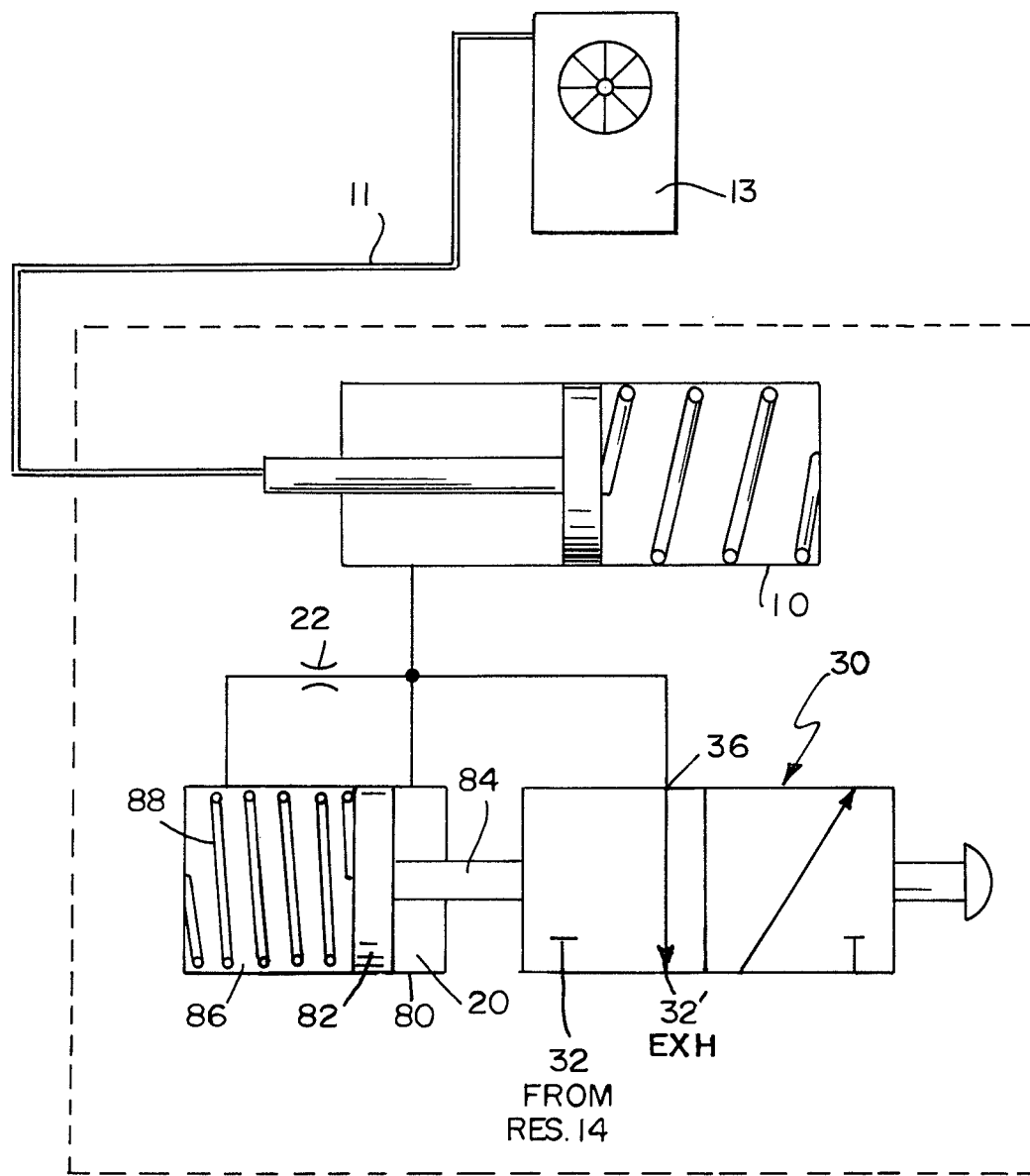
FIG. 4 is a schematic of a hand brake control system for a rail vehicle hand brake according to a third embodiment of the present disclosure.

A first embodiment of a control system for automatic release of a hand brake is illustrated in FIG. 1. A pneumatic cylinder 10 via a clevis, or a similar mechanism, like a pushrod with a ball-end, and a corresponding socket geometry on the release lever or a cable 11 as shown in FIG. 4, is connected to the trigger or the release lever of the hand brake on a vehicle. A pneumatic control circuitry 12 includes a first source of pressure shown as a reservoir 14 and a restriction or choke 16. A second choke 18 connects the cylinder 10 to exhaust or atmosphere. Any system leaking is allowed to go to exhaust through choke 18 and thus prevents undesired release of the hand brake.

The reservoir 14 may be an emergency reservoir portion or an auxiliary reservoir portion generally available on the vehicle. This is just an example of a reservoir. A port or quick disconnect fitting may be provided to allow an external source of pressure not on the vehicle to be connected to the circuit 12. This may be, for example, from a way-side air supply and offers an alternative to the reservoir if the reservoir does not have sufficient pressure to operate the system.

A manual valve 30 in combination with a volume 20 control a first pneumatic valve 40 to selective connect the source of pressure 14 to the cylinder 10. The volume 20 and a choke 22 prolong the time the source of pressurize 14 is connected to the pneumatic cylinder 10 by pneumatic valve 40 after the manual valve 30 is activated. This prolongs activation of the release mechanism of the hand brake to assure full release of the hand brake.

The source of pressure 14 is connected to a first input 32 of a first valve 30. The first valve 30 is illustrated as a manually operated valve having an operator 34. The output 36 of valve 30 is connected to the volume 20. Spring 38 biases the valve 30 in the shown position where the supply pressure at input 32 is not connected to the output 36. The volume 20 is charged when, valve 30 is activated and maintains its charge after the valve 30 is released or deactivated for a preselected period determined by the choke 22. Preferably, this prolonged period is in the range of 5 to 10 seconds. Although the choke 22 is shown connected to exhaust or atmosphere in FIGS. 1 and 2, it can be connected to any source or volume of lower pressure than that of the charged volume 20 as shown in FIG. 4.

Figure 3:
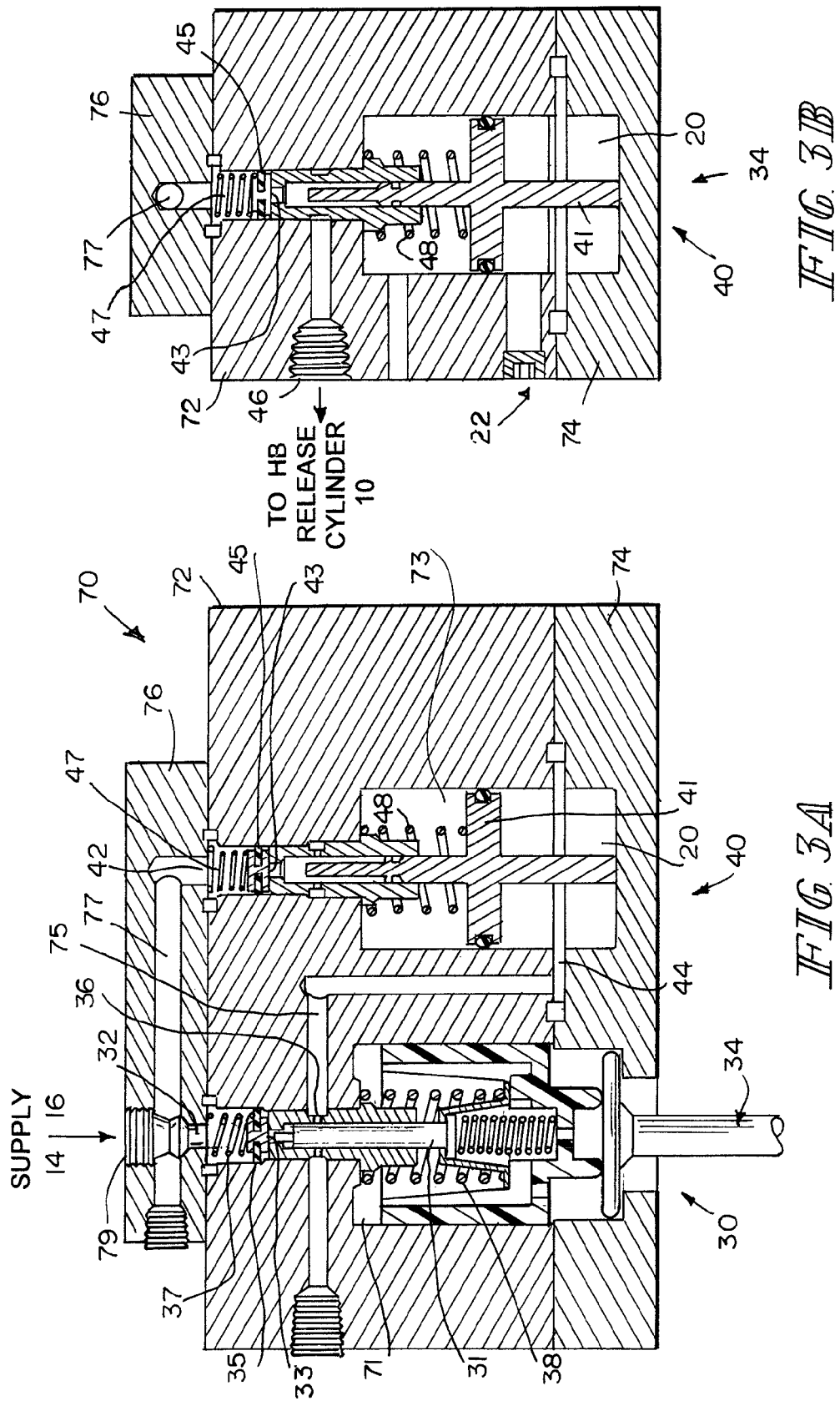
FIGS. 3A and 3B are cross-sectional views of a manifold including portions of the schematic of FIG. 1 according to the present system.

The manual operator 34 of the valve 30, as shown in FIG. 3A, may be a rocker type mechanical lifter that can be actuated from any 360 degrees about its center. The rocker mechanism also provides for automatic reset of the valve 30 when the mechanical actuator is released and automatically returns to its neutral position.

A second valve 40 is a pneumatic valve having an input 42 connected to the source of pressure 14 and an output 46 connected to the cylinder 10. A pilot port 44 of valve 40 is connected to the volume 20. Spring 48 biases the valve 40 in the shown position where the supply pressure at input 42 is not connected to the output 46. The valve 40 is moved to a position connecting the source of pressure at its input 42 to its output 46 and the cylinder 10 when the volume is charged to a predetermined trip pressure. It is held in this position until the volume is reduced below the trip pressure by choke 22. The manual valve 30 only has to be activated for ½ to 1 seconds for the volume to reach the trip pressure and in the range of ½ to 1 seconds to reach a pressure which will maintain valve 40 activated for 5 to 10 seconds.

A third valve 50 may be provided as illustrated as an electro-pneumatic valve. The first input 52 is connected to the pressurized source 14. A second input 54 is connected to exhaust or atmosphere. The output 56 is connected to the cylinder 19 via a one way check valve 59. Spring 58 biases the valve 50 in the position shown, wherein the connection to the supply at input 52 is terminated and exhaust at input 54 is connected to its output 56 and input of cylinder 10. Thus, in the stable position shown of the valves 30, 40 and 50, the release cylinder 10 is deactivated.

For manual actuation using operator 34, the valve 30 is moved to its applied or activated position connecting the pressurized supply at input 32 to its output 36 and charging volume 20. Once charged to a tripping pressure, the pressure in volume 20 moves valve 40 to its activated position connecting the pressurized supply at input 42 to its output 46 and to the cylinder 10. This activates cylinder 10, activating the release trigger and releasing the hand brake. Once the operator releases the operator 34, the spring 38 causes the valve 30 to move to its stable position, cutting off the supply of air to the volume 20 which prolongs the activation of valve 40 until its pressure is reduced by choke 22 to below the trip pressure of the valve 40. Once the valve 40 returns to its stable position, the source of pressure 14 is cut off and cylinder 10 is deactivated by bleeding of the activation pressure by choke 18.

The electro-pneumatic valve 50 may be actuated by an electric signal from its stable position shown to a second position. This connects the pressurized supply at input 52 to its output 56. This is provided directly through input 34 to output 36 of valve 30. This activates the cylinder 10 which moves the brake release trigger or lever. Upon removal of the signal, spring 58 moves the valve 50 back to the position shown, connecting the cylinder 10 to exhaust and input 54 of valve 50.

The valve 50 may be connected to an ECP car control device CCD which is connected to a train line and activated upon receiving a hand brake release signal from the locomotive. Providing such system is described in U.S. Pat. No. 7,073,753 and is incorporated herein by reference. Alternatively, the valve 50 may be actuated by a hand held device carried by operator as he walks the train. Such a device is shown, for example, in U.S. Pat. No. 6,175,784.

Figure 2:
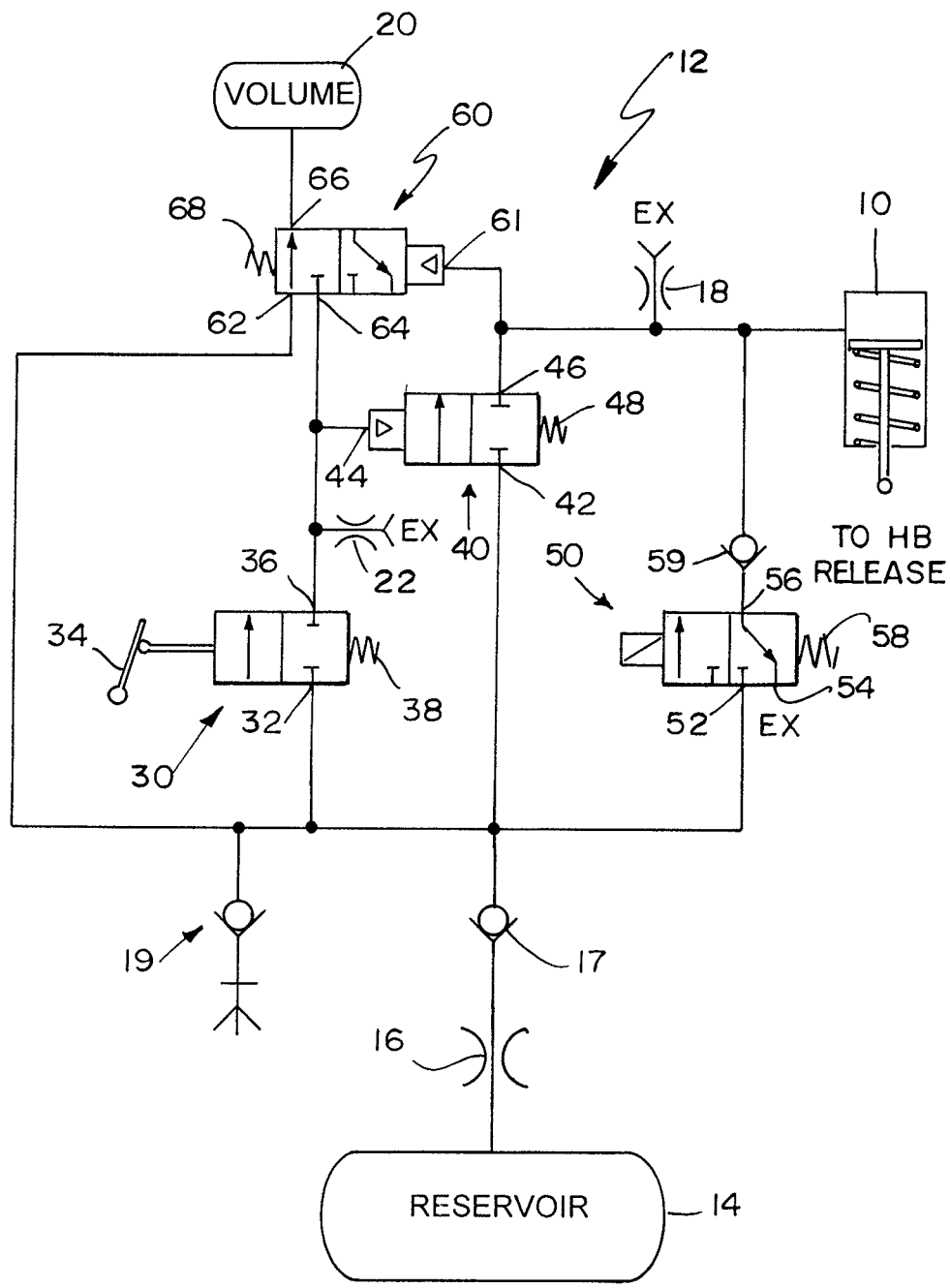
FIG. 2 is a schematic of a hand brake control system for a rail vehicle hand brake according to a second embodiment of the present disclosure.

A second embodiment of a control system for automatic release of a hand brake is illustrated in FIG. 2. As in the first embodiment, the source of pressure 14 is connected to the first input 32 of a first valve 30. Spring 38 biases the valve 30 in the shown position where the supply pressure at input 32 is not connected to the output 36. In this embodiment, the output 36 of valve 30 is connected directly to the pilot port 44 of the first pneumatic valve 40.

The volume 20 is selectively charged from the source of pressure 14 or connected to the pilot port of the first pneumatic valve 40 by a second pneumatic valve 60. Port 66 of valve 60 is selectively connected to ports 62 for the source of pressure 14 or port 64 connected to pilot port 44 of valve 40. Spring 68 biases the valve 60 in the shown position where the supply pressure 14 at input 62 is connected to the output 66 to charge the volume 20. A pilot port 61 of the valve 60 is connected to the output 46 of valve 40.

Once valve 40 is activated by the manual valve 30, the pressure at its output 46 activates the cylinder and the valve 60. The valve 60 then moves to disconnect the source of pressure 14 from the volume 20 and connect the volume 20 to the pilot port 44 of the valve 40. As in the first embodiment, volume 20 will prolong the activation of valve 40 after the release of manual valve 30 as determined by the choke 22.

An efficient implementation of portion of the circuitry 12 of FIG. 1 is shown in FIGS. 3A and 3B. A manifold 70 includes a body 72 with face plates 74 and 76. The manifold 70 includes passages for interconnecting and in which is mounted the manual valve 30, the first pneumatic valve 40, the volume 20 and the first choke 22. The manifold includes ports for the source of pressure 14 and the pneumatic cylinder 10.

The manual valve 30 is mounted in bore 71 and the pneumatic valve 40 is mounted in bore 73. A passage 75 connects the output 36 of the manual valve to the volume 20 in bore 73 below the piston/actuator 41 of valve 40. This is also the pilot port 44 for the valve 40. The portion of the bore 73 above the piston is connected to atmosphere directly, while the volume 20 below the piston 41 is connected to atmosphere or exhaust by choke 22 as shown in FIG. 3B. A passage 77 connects the source of pressure 14 at port 79 to the inputs 32 and 42 of valves 30 and 40 respectively.

An example of the manually operated valve 30 is shown in detail in FIG. 3A. The operator 31 is a rocker mechanism held in its position down by spring 38. Upon movement in any 360 degree radial direction, it raises pushing valve element 35 off valve seat 33 against spring 37. This connects the pressure source at input 32 to the outlet 36. In its stable position shown, the valve element 35 sits on valve seat 33 closing off the connection between supply at input 32 and the output 36. The output 36 is connected via passage 75 to the volume 20. The structure shown is, for example, similar to the release valve DB10A available on the brake control valve DB-60 available from New York Air Brake Corporation.

An example of the pneumatic valve 40 is shown in detail in FIGS. 3A and 3B. The piston/operator 41 is a rocker mechanism held in its position down by spring 34. When the volume 20 is charged to the trip pressure, piston 41 raises pushing valve element 45 off valve seat 43 against spring 47. This connects the pressure source at input 42 to the outlet 46. In its stable position shown, the valve element 45 sits on valve seat 43 closing off the connection between supply at input 42 and the output 46. The output 46 is connected to the cylinder 10.

Although valve 30 shown in FIG. 3A is just an example of a manually operated valve, other valves may be used, which automatically resets to a stable position upon removing the force applied manually. By using the specific valve shown which is operable from multiple positions along the vehicle, only one valve 30 need be used for operation from both sides of the vehicle.

A third embodiment is shown in FIG. 4 including the manual valve 30 connected at outlet 36 to the cylinder 10 and the volume 20. The cylinder 10 is connected by cable 11 to the release mechanism of the parking hand brake 13. The manual valve 30 has the source of pressure from the reservoir 14 at input 32 and a second input 32' connected to exhaust. An actuator 80 includes a piston 82 connected to by piston rod 84 to the manual valve 30. The piston 82 divides the actuator 80 into two chambers including the volume 20 and volume 86. A spring 88, biases the piston 82 and the manual valve 30 to the deactivated position, not shown.

When the manual valve 30 is manually activated to the position shown in FIG. 4, its output 36 is disconnected from the exhaust at input 32' and connected to the source of pressure from reservoir 14 at inlet 32. Prior to activation of the manual valve 30, the cylinder 10 and both volumes 20 and 86 of the actuator 80 are connected to exhaust by the manual valve 30. After activation of manual vale 30, the piston 10 and the volume 20 are charged and the cylinder 10 and piston 82 move to the position shown in FIG. 4. The choke 22 and the pressure in volume 20 prevent the volume 86 from being initially significantly charged. The pressure in volume 20 initially holds the piston 82 and consequently the manual valve 30 in the activated position shown.

The air pressure in volume 86 increases with time as defined by at least the choke 22, since it is initially at a lower pressure than volume 20. As the air pressure in volume 86 in combination with the force of spring 88 exceed the force produced by the pressure in chamber 20, the piston 82 moves to the right in the figure and moves the manual valve 30 towards its deactivated position. Once in the deactivated position, manual valve 30 connects the cylinder 10 and the volumes 20 and 86 to exhaust at input 32'. Due to the choke 22, the cylinder and the volume 20 are depleted faster than volume 86. The spring 88 holds the manual valve 30 in the deactivated position once all the volumes 86 and 20 are depleted.

An example of the manual valve 30 and the actuator 80 of FIG. 4 is illustrated in FIGS. 5A, 5B, and 5C. The structure which is similar to those of FIGS. 3 and 4 will have the same reference numerals. A manifold 70 includes a body 72 with face plates 74 and 76. The manifold 70 includes passages for interconnecting and in which is mounted the manual valve 30, the volume 20, the first choke 22 and the actuator 80. The manifold includes ports for the source of pressure 14 and the pneumatic cylinder 10.

The manual valve 30 and the actuator 80 are mounted in bore 71. An example of the manually operated valve 30 includes an operator 31 is a rocker mechanism held in its position down by spring 38. Upon movement in any 360 degree radial direction, it raises from the position shown in FIG. 5A into engagement with the piston rod 84 of piston 82 of the actuator 80. Further upward movement and operation of the manual valve and actuator 80 are shown in FIGS. 5B and 5C.

The manual valve 30 and the actuator 80 are shown as an integral slide valve structure. The piston 82 and the piston rod 84 form the slide element of the slide valve and include gaskets 81, 83 and 85. The slide element and the gaskets move relative to ports on the wall of the upper portion bore 71. The ports are connected to reservoir input 32, exhausts 32, 32' and output 36. Volume 20 is in bore 71 between the piston 82 and piston rod 84. Volume 86 is on the other side of the piston 82 and includes a spring 88. The choke 22 is a passage in the piston 82 connecting the volumes 20 and 86.

A detent mechanism 90 is provided and includes a detent element 92 and a spring 94. The detent element 92 engages the side of piston rod 84 in FIGS. 5A and 5B and is below the piston rod 84 in FIG. 5C to retain it raised. Although the detent 90 defines a more binary or sharp end to the elongated time of activation of the release cylinder, the structure may be used without the detent 90.

In the stable deactivated state of FIG. 5A, volumes 20 and 82 and output 86 to the cylinder 10 are connected to exhaust inputs 32'. Reservoir input 32 is sealed off by gaskets 83 and 84. During the initial motion of the manual operator 34, operator 31 engages the piston rod 84 and moves the piston rod 84 and piston 82 up as shown in FIG. 5B. The gaskets 81 and 85 respectively disconnect the volumes 20/output 36 and 82 from exhaust inputs 32'. Gasket 83 terminates the connection of the source of pressure input 32.

Further motion of the manual operator 34 and operator 31 move the piston rod 84 and piston 82 up as shown in FIG. 5C. Gasket 83 uncovers the source of pressure input 32 and connects it to the volume 22 and the output 64 to the cylinder. The gaskets 81 and 85 respectively continue to disconnect the volumes 20/output 36 and 82 from exhaust inputs 32'. The piston 82 and piston rod 84 are retained in this valved position by the detent 90. The choke 22 slows the charging of the volume 82 compared to the volume 20 and creates a pressure differential across piston 62. The pressure differential is sufficient to hold the piston 82 and consequently the manual valve 30 in the activated position shown without the detent 90.

The air pressure in volume 82 increases with time as defined by at least the choke 22, since it is initially at a lower pressure than volume 20. As the air pressure in volume 86 in combination with the force of spring 88 exceed the force produced by the pressure in chamber 20 and a sufficient force to overcome the detent 90, the piston 82 snaps down in the figure to the deactivated position of FIG. 5A. Once in the deactivated position, the cylinder 10 and the volumes 20 and 86 are connected to exhaust at input 32'. The spring 88 holds the manual valve in the deactivated position once all the volumes 86 and 20 are depleted.

Although the present hand brake control system has been described and illustrated in detail, it is to be clearly understood that the same is by way of illustration and example only, and is not to be taken by way of limitation. The scope of the present invention is to be limited only by the terms of the appended claims.

What is claimed:

1. In a rail vehicle hand brake having a release activated by a pneumatic cylinder, a control system comprising:
a manual valve having an output connected to a source of pressure at an input when manually activated;
a volume connected to the output of the manual valve and charged by the source of pressure when the manual valve is activated; and
a choke connecting the volume to a source of lower pressure when the volume is charged;
whereby the volume and the choke prolong the time the source of pressure is connected to the pneumatic cylinder after the manual valve is activated.

2. The system according to claim 1, including an actuator having a piston operatively connected to the manual valve, and wherein the volume is in the actuator on a first face of the piston for holding the piston and the manual valve actuated for the prolonged time.

3. The system according to claim 2, wherein the choke connects the volume to a volume on a second face of the piston opposite the first face of the piston.

4. The system according to claim 2, wherein the choke is a passage in the piston.

5. The system according to claim 1, wherein the volume is connected to a pneumatic cylinder.

6. The system according to claim 1, wherein the choke continuously connects the volume to the source of lower pressure.

7. The system according to claim 1, wherein the manual valve is a slide valve having a slide and the piston is the slide of the slide valve.

8. The system according to claim 1, including a detent to hold the manual valve activated during the prolonged time.

* * * * *